United States Patent
Lee (10) Patent No.: US 9,481,819 B2
(45) Date of Patent: Nov. 1, 2016

(54) METHOD OF MANUFACTURING ALUMINA-BASED ABRASIVE GRAIN AND ALUMINA-BASED ABRASIVE GRAIN MANUFACTURED THEREBY

(71) Applicant: DAEHAN CERAMICS CO., LTD., Jeollanam-do (KR)

(72) Inventor: Jong Keun Lee, Seoul (KR)

(73) Assignee: DAEHAN CERAMICS CO., LTD., Jeollanam-do (KR)

(*) Notice: Subject to any disclaimer, the term of this patent is extended or adjusted under 35 U.S.C. 154(b) by 110 days.

(21) Appl. No.: 14/399,791

(22) PCT Filed: Nov. 29, 2012

(86) PCT No.: PCT/KR2012/010219
§ 371 (c)(1),
(2) Date: Nov. 7, 2014

(87) PCT Pub. No.: WO2013/176358
PCT Pub. Date: Nov. 28, 2013

(65) Prior Publication Data
US 2015/0101255 A1 Apr. 16, 2015

(30) Foreign Application Priority Data
May 24, 2012 (KR) .................. 10-2012-0055174

(51) Int. Cl.
*B24D 3/00* (2006.01)
*B24D 11/00* (2006.01)
(Continued)

(52) U.S. Cl.
CPC .......... *C09K 3/1409* (2013.01); *C04B 35/1115* (2013.01); *C04B 35/624* (2013.01);
(Continued)

(58) Field of Classification Search
USPC .................................. 51/298, 293, 307, 309
See application file for complete search history.

(56) References Cited

U.S. PATENT DOCUMENTS 2,692,240 A * 10/1954 Sprauer .................... B01J 23/96
252/DIG. 18

(Continued)

FOREIGN PATENT DOCUMENTS

| EP | 0408771 A1 | 1/1991 |
|---|---|---|
| JP | 2007-169085 A | 7/2007 |
| KR | 10-2002-0042869 A | 6/2002 |
| KR | 10-2007-0050594 A | 5/2007 |
| KR | 10-2012-0029581 A | 3/2012 |

OTHER PUBLICATIONS

Search Report for related European Application No. 12877507.9; report dated Nov. 25, 2015.
International Search Report based on corresponding International Appl. No. PCT/KR2012/010219; ISR mailed on Feb. 26, 2013.

*Primary Examiner* — James McDonough
(74) *Attorney, Agent, or Firm* — Miller, Matthias & Hull LLP (57) ABSTRACT

Provided are a method of manufacturing an alumina-based abrasive grain, which includes preparing boehmite powder and activated alumina powder as starting materials, forming a sol by wet-blending and crushing the boehmite powder, the activated alumina powder, a solvent and a deflocculant, heating the sol at a first temperature which is higher than a room temperature and lower than a boiling point of the solvent and stirring the sol so as not to generate a precipitate, forming a gel by heating the sol at a second temperature higher than the first temperature at which a viscosity of the sol is increased and the sol becomes a paste, blending the gel with an organic solvent and performing wet crushing on the resulting mixture, preparing a powder by drying the wet-crushed gel, blending a binder and a solvent with the dried product, which is the powder, and molding the resulting mixture, calcining the molded product, performing dry crushing on the calcined product, and sintering the dry-crushed product to transform activated alumina and boehmite contained therein to an $\alpha$-$Al_2O_3$ crystal phase, and an alumina-based abrasive grain manufactured thereby. As a result, an alumina-based abrasive grain which is highly dense, has a high hardness, and exhibits a high purity may be manufactured using boehmite powder and activated alumina powder.

17 Claims, 5 Drawing Sheets

(51) Int. Cl.
*B24D 18/00* (2006.01)
*C09K 3/14* (2006.01)
*C04B 35/111* (2006.01)
*C04B 35/624* (2006.01)
*C04B 35/626* (2006.01)

(52) U.S. Cl.
CPC ... *C04B35/6261* (2013.01); *C04B 2235/3218* (2013.01); *C04B 2235/5409* (2013.01); *C04B 2235/5436* (2013.01); *C04B 2235/72* (2013.01); *C04B 2235/77* (2013.01); *C04B 2235/96* (2013.01)

(56) References Cited

U.S. PATENT DOCUMENTS

| | | | | |
|---|---|---|---|---|
| 5,076,815 A | * | 12/1991 | Kunz | C04B 35/111 501/127 |
| 2003/0183579 A1 | * | 10/2003 | Bandyopadhya | B01D 39/2079 210/663 |
| 2008/0308528 A1 | * | 12/2008 | Wang | C01F 7/02 216/53 |
| 2013/0305615 A1 | * | 11/2013 | Tomikawa | B82Y 30/00 51/308 |

* cited by examiner

METHOD OF MANUFACTURING ALUMINA-BASED ABRASIVE GRAIN AND ALUMINA-BASED ABRASIVE GRAIN MANUFACTURED THEREBY

CROSS-REFERENCE TO RELATED APPLICATIONS

This application is a U.S. National Stage filing under 35 USC §371 of International Patent Application No. PCT/KR2012/010219 filed on Nov. 29, 2012, which claims priority under the Paris Convention to Korean Application No. 10-2012-0055174, filed on May 24, 2012.

FIELD OF THE DISCLOSURE

The present disclosure relates to an abrasive grain and a method of manufacturing the same, and more particularly, to a method of manufacturing an alumina-based abrasive grain which is highly dense, has a high hardness, exhibits a high purity, has high reproducibility, and is capable of being produced on a large scale using boehmite powder and activated alumina powder, and an alumina-based abrasive grain manufactured thereby.

BACKGROUND OF THE DISCLOSURE

As industries of semiconductors, ships, and industrial parts are developed, a market for abrasives is expanding. According to the spread of products requiring precision processing, abrasives need precision and reliability.

In addition, there is a demand for developing a highly-functional, abrasive grain for polishing a product manufactured of stainless steel, titanium, a nickel alloy or aluminum. To develop the highly-functional abrasive grain, extension of a life span, enhancement of durability, and enhancement of a processing degree of the abrasive are required.

Alumina ($Al_2O_3$) is widely used as an abrasive, since it has excellent physical properties such as excellent heat resistance and corrosion resistance and a high hardness compared to various ceramic elements.

Since an alumina abrasive has an intermediate characteristic between an artificial diamond or CBN and melted alumina, a new market for replacing part of the demand for an artificial diamond or CBN and melted alumina is being created.

However, a conventional abrasive using an alumina grain has many difficulties in enhancing durability and a cutting rate. During polishing or grinding, since grain particles are broken and thus the grain is released, it is impossible to have contact between a grinded surface and the grain, which becomes a cause of reducing a polishing or grinding rate.

Accordingly, there is a demand for developing an alumina abrasive which is highly dense and has a high hardness.

The present disclosure is directed to providing a method of manufacturing an alumina-based abrasive grain which is highly dense, has a high hardness and a high purity, has a high reproducibility and is capable of being produced on a large scale using boehmite powder and activated alumina powder, and an alumina-based abrasive grain manufactured thereby.

One aspect of the present invention provides a method of manufacturing an alumina-based abrasive grain, which includes (a) preparing boehmite powder and activated alumina powder as starting materials, (b) forming a sol by wet-blending and crushing the boehmite powder, the activated alumina powder, a solvent and a deflocculant, (c) heating the sol at a first temperature which is higher than a room temperature and lower than a boiling point of the solvent and stirring the sol so as not to generate a precipitate, (d) forming a gel by heating the sol at a second temperature higher than the first temperature at which a viscosity of the sol is increased and the sol becomes a paste, (e) blending the gel with an organic solvent and performing wet crushing on the resulting mixture, (f) preparing a powder by drying the wet-crushed gel, (g) blending a binder and a solvent with the dried product, which is the powder, and molding the resulting mixture, (Ii) calcining the molded product, (i) performing dry crushing on the calcined product, and (j) sintering the dry-crushed product to transform activated alumina and boehmite contained therein to an $\alpha$-$Al_2O_3$ crystal phase.

The activated alumina powder may be at least one transition alumina selected from $\gamma$-$Al_2O_3$, $\delta$-$Al_2O_3$, $\theta$-$Al_2O_3$ and $\eta$-$Al_2O_3$.

The boehmite powder and the activated alumina powder may be blended in a weight ratio of 1:1 to 3:1.

The deflocculant may be at least one acid selected from nitric acid ($HNO_3$) and hydrochloric acid (HCl), and the sol may have a pH of 2 to 5.

The wet-blending may be performed by wet ball milling, an inner wall of a ball mill for the wet ball milling may be lined with alumina, and a ball used in the wet ball milling may be formed of alumina.

The heating in the step (c) may be performed by injecting a hot air whose temperature is higher than the room temperature and lower than the boiling point of the solvent.

The injection of the hot air may be performed by supplying an air to a heat exchanger using a pump to heat the air, and injecting the hot air into a heating agitator. As the hot air is introduced under the sol, thereby inducing convection of the sol, generation of a precipitation may be inhibited, and uniform blending may be performed.

The gel and the organic solvent may be blended in a weight ratio of 1:0.1 to 3, and as the organic solvent, at least one alcohol selected from ethanol and methanol may be used.

The wet crushing may be performed by wet ball milling, an inner wall of a ball mill for the wet ball milling may be lined with alumina, and a ball used in the wet ball milling may be formed of alumina.

The dry crushing may be performed by dry ball milling, an inner wall of a ball mill for the dry ball milling may be lined with alumina, and a ball used in the dry ball milling may be formed of alumina.

The molding may be continuous compression molding, which may include supplying the dried product through a hopper of a compression molding machine, transferring the dried product injected through the hopper into a cylinder at which an end of a screw is placed while providing compounding and compression due to rotation of the screw, transferring the resulting product transferred into the cylinder to a segment roll by the rotation of the screw, transferring the resulting product transferred to the segment roll to an outlet with compression in-between the segment rolls, and molding the resulting product transferred to the outlet in a pellet type after discharging to an outside.

The binder may be at least one selected from polyvinylalcohol, polyethyleneglycol and cellulose, and blended at 0.1 to 30 parts by weight with respect to 100 parts by weight of the dried product.

The calcination may be performed at 400 to 800° C., which is higher than a temperature for burning off the binder, in an oxygen atmosphere.

The calcination may be performed by heating a rotary tube furnace at a calcination temperature of 400 to 800° C. using a gas burner, charging the molded product to the rotary tube furnace using a feeder for fuel supply, performing calcination while the charged product flows toward the gas burner due to the rotation of a tilted rotary tube furnace, and transferring the calcined product to a tilted rotary cooler into which an external cold air flows for cooling.

The sintering may be performed at 1200 to 1650° C., which is higher than the temperature at which the activated alumina is transitioned to a α-$Al_2O_3$ crystal phase, in an oxidizing or neutral atmosphere.

The sintering may be performed by heating a rotary furnace at 1200 to 1650° C. using a gas burner, charging the dry-crushed product to the rotary tube furnace using a feeder for fuel supply, sintering the charged product while the charged product flows toward the gas burner due to the rotation of a tilted rotary tube furnace, transferring the sintered product to a tilted rotary cooler into which a cold air flows for cooling, and classifying the cooled product using a vibrating screen to obtain an alumina-based abrasive grain having a desired particle size distribution.

The method of manufacturing an alumina-based abrasive grain may further include performing dry crushing of the dried product between the step (f) and the step (g). The dry crushing of the dried product may be performed by dry ball milling, an inner wall of a ball mill for the dry ball milling may be lined with alumina, and a ball used for the dry ball milling may be formed of alumina.

In another aspect, the present disclosure provides an alumina-based abrasive grain manufactured by the method of manufacturing an alumina-based abrasive grain, which has a Vicker's hardness of 15 to 25 MPa, a fracture toughness of 2 to 10 MPa, and a bulk density of 3.70 to 3.92 $g/cm^3$, and includes a corundum crystal having a size of 0.1 to 2 μm.

According to the present disclosure, an alumina-based abrasive grain which is highly dense, has a high hardness, and exhibits a high purity can be manufactured using boehmite powder and activated alumina powder.

In addition, according to the present disclosure, a sintered alumina-based abrasive grain is classified by particle size to have a particle size distribution according to nominal specifications (KS, ISO, FEPA, etc.).

The alumina-based abrasive grain manufactured according to the present disclosure has a Vicker's hardness of 15 to 25 MPa, a fracture toughness of 2 to 10 MPa, and a bulk density of 3.70 to 3.92 $g/cm^3$, is highly dense, and exhibits a high hardness and a high purity.

In addition, in the alumina-based abrasive grain manufactured according to the present disclosure, corundum crystals having a size of 0.1 to 2 μm are densely linked.

In addition, according to the present disclosure, the alumina-based abrasive grain can be easily manufactured using solid-phase boehmite (AlOOH) powder and activated alumina, which include an aluminum (Al) component, can have a high reproducibility due to a simple process, and can be produced on a large scale.

SUMMARY OF THE DISCLOSURE

A method of manufacturing an alumina-based abrasive grain according to an exemplary embodiment of the present disclosure includes (a) preparing boehmite powder and activated alumina powder as starting materials, (b) forming a sol by wet-blending and crushing the boehmite powder, the activated alumina powder, a solvent and a deflocculant, (c) heating the sol at a first temperature which is higher than a room temperature and lower than a boiling point of the solvent and stirring the sol so as not to generate a precipitate, (d) forming a gel by heating the sol at a second temperature higher than the first temperature so that a viscosity of the sol is increased and the sol becomes a paste, (e) blending the gel with an organic solvent and performing wet crushing on the resulting mixture, (f) preparing a powder by drying the wet-crushed gel, (g) blending a binder and a solvent with the dried product, which is the powder, and molding the resulting mixture, (h) calcining the molded product, (i) performing dry crushing on the calcined product, and (j) sintering the dry-crushed product to transform activated alumina and boehmite contained therein to an α-$Al_2O_3$ crystal phase.

An alumina-based abrasive grain according to an exemplary embodiment of the present disclosure is manufactured by the method of manufacturing an alumina-based abrasive grain, and has a Vicker's hardness of 15 to 25 MPa, a fracture toughness of 2 to 10 MPa, and a bulk density of 3.70 to 3.92 g/cm3, and includes a corundum crystal having a size of 0.1 to 2 μm.

Hereinafter, exemplary examples according to the present disclosure will be described in detail with reference to the accompanying drawings. However, the following examples are provided so that the present disclosure is be fully understood by those of ordinary skill in the art, can be modified in various forms, and the scope of the present disclosure is not limited to examples to be described below. In the drawings, like numerals denote like elements.

In descriptions below, the term "nano size" means a size in a nanometer unit (nm) from 1 to 1000 nm.

A method of manufacturing an alumina-based abrasive grain according to an exemplary embodiment of the present disclosure includes (a) preparing boehmite powder and activated alumina powder as starting materials, (b) forming a sol by wet-blending and crushing the boehmite powder, the activated alumina powder, a solvent and a deflocculant, (c) heating the sol at a first temperature which is higher than a room temperature and lower than a boiling point of the solvent and stirring the sol so as not to generate a precipitate, (d) forming a gel by heating the sol at a second temperature higher than the first temperature so that a viscosity of the sol is increased and the sol becomes a paste, (e) blending the gel with an organic solvent and performing wet crushing on the resulting mixture, (f) preparing a powder by drying the wet-crushed gel, (g) blending a binder and a solvent with the dried product, which is the powder, and molding the resulting mixture, (h) calcining the molded product, (i) performing dry crushing of the calcined product, and (j) sintering the dry-crushed product to transform activated alumina and boehmite contained therein to an $\alpha$-$Al_2O_3$ crystal phase.

The activated alumina powder may be formed of at least one transition alumina selected from $\gamma$-$Al_2O_3$, $\delta$-$Al_2O_3$, $\theta$-$Al_2O_3$ and $\eta$-$Al_2O_3$.

The boehmite powder and the activated alumina powder may be blended in a weight ratio of 1:1 to 3:1.

The deflocculant may be at least one acid selected from nitric acid ($HNO_3$) and hydrochloric acid (HCl), and the sol may have a pH of 2 to 5.

The wet-blending may be performed by wet ball milling, an inner wall of a ball mill for the wet ball milling may be lined with alumina, and a ball used in the wet ball milling may be formed of alumina.

The heating in the step (c) may be performed by injecting a hot air whose temperature is higher than a room temperature and lower than a boiling point of the solvent.

The injection of the hot air may be performed by supplying an air to a heat exchanger using a pump to heat the air, and injecting the hot air to a heating agitator. When the hot air is introduced under the sol, thereby inducing convection of the sol, generation of a precipitation may be inhibited, and blending may be uniformly performed.

The gel and the organic solvent may be blended in a weight ratio of 1:0.1 to 3, and as the organic solvent, at least one alcohol selected from ethanol and methanol may be used.

The wet crushing may be performed by wet ball milling, an inner wall of a ball mill for the wet ball milling may be lined with alumina, and a ball used in the wet ball milling may be formed of alumina.

The dry crushing may be performed by dry ball milling, an inner wall of a ball mill for the dry ball milling may be lined with alumina, and a ball used in the dry ball milling may be formed of alumina.

The molding may be performed by continuous compression molding, which may include supplying the dried product using a hopper of a compression molding machine, transferring the dried product provided through the hopper into a cylinder at which an end of a screw is placed while providing compounding and compression due to rotation of the screw, transferring the resulting product transferred into the cylinder to a segment roll due to the rotation of the screw, transferring the resulting product transferred to the segment roll to an outlet with compression in-between the segment rolls, and molding the resulting product transferred to the outlet in a pellet type after discharging to an outside.

The binder may be at least one selected from polyvinylalcohol, polyethyleneglycol and cellulose, and the binder may be blended at 0.1 to 30 parts by weight with respect to 100 parts by weight of the dried product.

The calcination may be performed at 400 to 800° C., which is higher than the temperature for burning off the binder, in an oxygen atmosphere.

The calcination may be performed by heating a rotary tube furnace at 400 to 800° C. using a gas burner, charging the molded product to the rotary tube furnace using a feeder for fuel supply, performing calcining while the charged product flows toward the gas burner due to the rotation of a tilted rotary tube furnace, and transferring the calcined product to a tilted rotary cooler into which an external cold air flows to cool.

The sintering may be performed at 1200 to 1650° C., which is higher than the temperature at which the activated alumina is transitioned to a $\alpha$-$Al_2O_3$ crystal phase, in an oxidizing or neutral atmosphere.

The sintering may be performed by heating a rotary furnace at 1200 to 1650° C. using a gas burner, charging the dry-crushed product to the rotary tube furnace using a feeder for fuel supply, sintering the charged product while flowing toward the gas burner due to the rotation of a tilted rotary tube furnace, transferring the sintered product to a tilted rotary cooler into which a cold air flows to cool, and classifying the cooled product using a vibrating screen to obtain an alumina-based abrasive grain having a desired particle size distribution.

The method of manufacturing an alumina-based abrasive grain may further include performing dry crushing of the dried product between the step (f) and the step (g). The dry crushing of the dried product may be performed by dry ball milling, an inner wall of a ball mill for the dry ball milling may be lined with alumina, and a ball used for the dry ball milling may be formed of alumina.

An alumina-based abrasive grain manufactured by the method according to the present disclosure has a Vicker's hardness of 15 to 25 MPa, a fracture toughness of 2 to 10 MPa, and a bulk density of 3.70 to 3.92 g/cm$^3$, and includes a corundum crystal having a size of 0.1 to 2 μm.

Hereinafter, the method of manufacturing an alumina-based abrasive grain according to an exemplary embodiment of the present disclosure will be described in detail.

As starting materials, boehmite (AlOOH) powder and activated alumina powder are prepared.

Boehmite (AlOOH) may be alumina monohydrate, and an average particle size of the boehmite powder used in an exemplary embodiment of the present disclosure may be approximately 1 to 100 μm. When the average particle size of the boehmite powder is less than 1 μm, the powder is expensive and thus not economical, and when the average particle size of the boehmite powder is more than 100 μm, it takes time to perform a following crushing process, and it is difficult to form the particles to a predetermined size or less. As boehmite (AlOOH) including an aluminum (Al) component and a hydroxide (OH) group volatilized (or evaporated) at a high temperature is used, an alumina-based abrasive grain with a high purity, not containing impurities, may be obtained.

The activated alumina powder may be at least one transition alumina selected from Gamma($\gamma$)-$Al_2O_3$, Delta($\delta$)-$Al_2O_3$, Theta($\theta$)-$Al_2O_3$ and Eta($\theta$-$Al_2O_3$. An average particle size used in an exemplary embodiment of the present disclosure may be approximately 1 to 100 μm. When the average particle size of the activated alumina powder is less than 1 the powder is expensive and thus not economical, and when the average particle size of the activated alumina powder is more than 100 μm, it takes time to perform the following crushing process, and it is difficult to form the particles to a predetermined size or less.

Activated alumina is a common name of transition alumina obtained by aluminum hydroxide (Al(OH)$_3$) or boehmite (AlOOH). The activated alumina includes low temperature-type transition alumina such as Gamma($\gamma$)-$Al_2O_3$, Eta($\eta$)-$Al_2O_3$, and Chi($\chi$)-$Al_2O_3$, and high temperature-type transition alumina such as Delta($\delta$)-$Al_2O_3$, Theta($\theta$)-$Al_2O_3$, and Kappa($\kappa$)-$Al_2O_3$. Among such transition alumina, $\gamma$-$Al_2O_3$ and $\eta$-$Al_2O_3$ have the highest surface chemical activity. The transition alumina is crystallized into Alpha ($\alpha$)-$Al_2O_3$ at approximately 1150° C. or more.

The boehmite powder and the activated alumina powder are wet-blended. The boehmite powder and the activated alumina powder are blended in a weight ratio of 1:1 to 3:1, and preferably, 2:1.

To make the alumina-based abrasive grain highly dense and enhance a hardness of the alumina-based abrasive grain, it is important to prepare a stable sol. To prepare a uniform sol during the manufacture of the alumina-based abrasive grain, it is important to finely disperse boehmite and activated alumina in a solvent (ion exchanged water). The powder prepared by mixing the boehmite and the activated alumina is contained at 20 to 40 wt %, and preferably, approximately 30 wt %, in the ion exchanged water.

To develop the high purity and high hardness alumina-based abrasive grain, a deflocculant that can form a stable sol should be selected. As the deflocculant, nitric acid ($HNO_3$), hydrochloric acid (HCl), sulfuric acid ($H_2SO_4$), or phosphoric acid ($H_3PO_4$) may be used, but to form a stable sol of the boehmite and the activated alumina, nitric acid ($HNO_3$), hydrochloric acid (HCl) or a mixture thereof may be used. The deflocculant may be added to a wet-blending process which will be described below, thereby forming a stable sol.

The blending is performed by a wet-blending process such as ball milling or attrition milling to make the powder finer and form a stable sol.

The wet ball milling process will be described as an example.

To uniformly mix and crush the boehmite powder and the activated alumina powder as starting materials, the powders were charged to a ball mill, and blended with a solvent such as an ion exchanged water or an alcohol. Here, the deflocculant was added to obtain a pH of approximately 2 to 5. When the pH is less than 2, there may have a problem in terms of work safety for a strong acid, and when the pH is more than 5, it may be difficult to form a stable sol.

An inner wall of the ball mill may be lined with high purity alumina. Since the inner wall of the ball mill is lined with alumina which is the same as a component for the alumina-based abrasive grain, compared to a composition with a different material, generation of impurities may be prevented, and a high purity alumina-based abrasive grain may be manufactured. In addition, micro alumina having a nano size produced by eroding the inner wall formed of the high purity alumina in the ball milling process may serve as a seed for stimulating transition of the boehmite or activated alumina to $\alpha\text{-}Al_2O_3$ during thermal treatment (sintering).

The boehmite powder and the activated alumina powder are mechanically crushed through rotation using a ball mill at a constant speed to uniformly blend. The powder mixture is uniformly blended and crushed into particles to become a stable sol.

A ball used in ball milling may be a ball formed of high purity alumina. Balls may have the same size, or at least two different sizes. As a ball formed of high purity alumina which is the same as the component for the alumina-based abrasive grain, compared to a ball composed of another material, generation of impurities may be prevented, and a high purity alumina-based abrasive grain may be manufactured. In addition, micro alumina having a nano size produced by eroding the inner wall formed of the high purity alumina in the ball milling process may serve as a seed for stimulating transition of the boehmite or activated alumina to $\alpha\text{-}Al_2O_3$ during thermal treatment (sintering).

For crushing to a desired particle size, a ball size, a milling time, and a rotation speed per minute of the ball mill are controlled. For example, in consideration of a particle size, a ball size may be set to approximately 5 to 50 mm, a rotation speed of a ball mill may be set to approximately 20 to 100 rpm. The ball milling may be performed for 5 to 72 hours in consideration of a desired particle size.

According to an exemplary embodiment of the present disclosure, in a wet-blending process, it is not necessary to separately add a seed for generating an alumina nucleus. In addition, micro alumina having a nano size worn during crushing of a high purity alumina lining material and a high purity alumina ball may serve as a seed for stimulating transition of the boehmite or activated alumina to $\alpha\text{-}Al_2O_3$ during thermal treatment (sintering) to form a more highly dense alumina-based abrasive grain.

The boehmite powder and the activated alumina powder are crushed into micro-sized particles by the ball milling, and the particles have a uniform particle size distribution, and uniformly blended.

A stable sol in which boehmite and activated alumina are uniformly dispersed in a solvent by the wet-blending process is formed.

The sol is contained in a heating agitator, heated at a first temperature higher than a room temperature and lower than a boiling point of the solvent used in the wet-blending process, and stirred so as not to have a precipitate. The first temperature higher than room temperature and lower than the boiling point of the solvent is approximately 35 to 80° C., and preferably 40 to 60° C. When the first temperature is higher than the boiling point of the solvent, gelation may drastically occur due to drastic evaporation of the solvent. Since boehmite and activated alumina are non-uniformly distributed by drastically performing the gelation, the heating to the first temperature may be performed at a temperature lower than the boiling point of the solvent.

The heating may be performed by injecting a hot air. A method of injecting a hot air may be performed by charging an air to a heat exchanger using a pump to heat, and injecting the hot air charged to the heat exchanger into the heating agitator. The hot air may be sprayed over the sol to heat, or may be introduced under the sol to heat. Since the method of injecting the hot air under the sol to heat may induce convection of the sol, the generation of a precipitate may be inhibited, and uniform blending may also be expected.

The stirring may be performed at a speed of approximately 1,000 to 20,000 rpm, and preferably, 5,000 to 15,000 rpm. The stirring may be performed for 1 to 48 hours, and preferably, 10 to 24 hours. As the stirring is performed, the solvent is slowly evaporated, and a viscosity of the sol is gradually increased. As described above, performing of the heating and stirring at the first temperature is performed to achieve gelation after the sol gradually has a high viscosity. This is because, when the gelation is drastically performed, the boehmite and the activated alumina may be non-uniformly dispersed.

Figure 1:
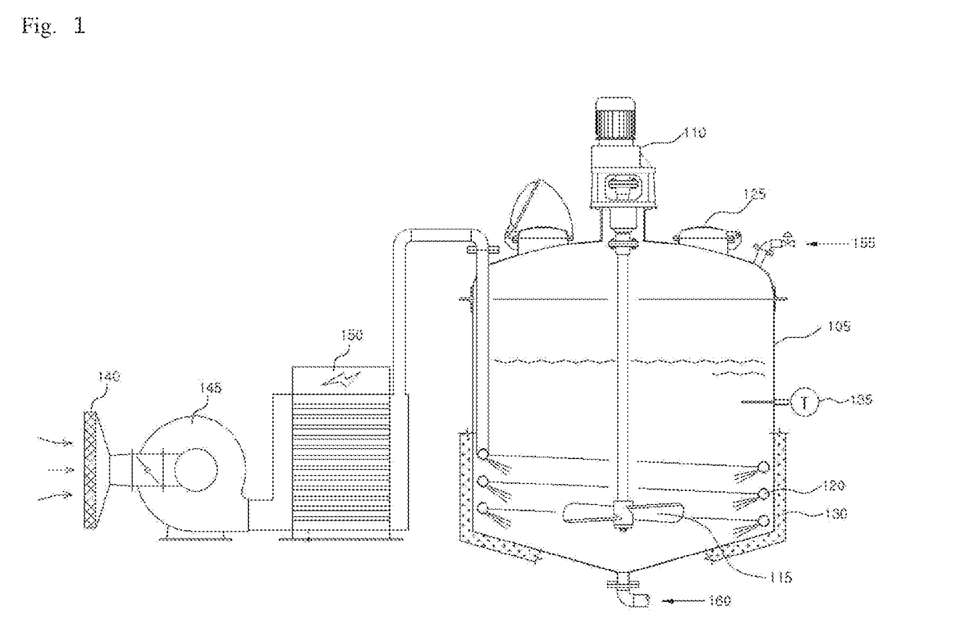
FIG. 1 is a diagram of an example heat agitator.

FIG. 1 is a diagram of an example heating agitator.

Referring to FIG. 1, the heating agitator includes a heating agitator 105 containing a sol and a moving vane 115 rotated by a motor 110, and the moving vane 115 is rotated at a speed of, for example, 1000 to 20000 rpm. The sol may be charged through a fuel supply door 125. The heating agitator 105 may include a heating coil 120 to perform heating, and an insulator 130 may be included under the heating agitator 105 to insulate or maintain a heat. In addition, the heating agitator may include a thermo transmitter 135, and thus a temperature of the sol may be detected using the thermo transmitter 135. In addition, the heating agitator includes an air filter 140, a hot air supply fan 145 and a heat exchanger 150 to inject a hot air, and the hot air may be charged to the heat coil 120 through the air filter 140, the hot air supply fan 145 and the heat exchanger 150, and the sol may be heated to a desired temperature using the heating coil 120. Since the hot air may be introduced under the sol to heat, convection of the sol may occur, the generation of a precipitate may be inhibited, and uniform blending may also be expected.

As the stirring is performed, a viscosity of the sol is gradually increased, and after a time passes, it is difficult to stir the sol due to high viscosity. When the sol becomes a high viscosity paste, to discharge the high viscosity paste-type sol formed by being heated at the first temperature in the heating agitator, the fuel supply door 125 is closed, an air is injected into the heating agitator 105 using an air supply tube 155 to apply a pressure, and then a discharging outlet 160 is open to discharge the resulting product to a dry furnace.

The discharged dry product is transferred to a dry furnace such as a convection dry furnace and dried at a second temperature higher than the first temperature, resulting in gelation of the product. The second temperature is approximately 45 to 200° C., and preferably 80 to 150° C. When the second temperature is higher than 200° C., the gelation may be drastically performed due to drastic evaporation of the solvent. The heating at the second temperature may be performed by injecting a hot air. The formation of a hot air may be performed by charging an air to a hot exchanger and heating the air charged to the heat exchanger. The gelation may be performed for 48 to 200 hours, and preferably 80 to 120 hours. As the gelation progresses, the solvent is evaporated, thereby transforming the sol to a gel having a network structure.

The gel is blended with an organic solvent, and wet-crushed. The gel may be blended with the organic solvent in a weight ratio of 1:0.1 to 3. The organic solvent may be ethanol or methanol.

The wet crushing is performed by ball milling or attrition milling to make a powder finer and prepare a stable sol.

The wet ball milling process will be described as an example.

The gel is charged to a ball mill with the organic solvent.

An inner wall of the ball mill may be lined with high purity alumina. Since the inner wall of the ball mill is lined with alumina which is the same as a component for an alumina-based abrasive grain, compared to use of another material, generation of impurities may be prevented, and a high purity alumina-based abrasive grain may be manufactured. In addition, in the ball milling process, nano-scale micro alumina generated by eroding the inner wall formed of the high purity alumina may serve as a seed stimulating transition of boehmite or activated alumina to $\alpha$-$Al_2O_3$ during thermal treatment (sintering).

The gel may be mechanically uniformly crushed by rotating the ball mill at a constant speed. A ball used in the ball milling may be formed of high purity alumina, and the balls may have the same size, or at least two different sizes. As the ball formed of high purity alumina which is the same as the component of the alumina-based abrasive grain is used, compared to use of another material, generation of impurities may be prevented, and a high purity alumina-based abrasive grain may be manufactured. In addition, in the ball milling process, nano-scale micro alumina generated by eroding the inner wall formed of the high purity alumina may serve as a seed stimulating transition of boehmite or activated alumina to $\alpha$-$Al_2O_3$ during thermal treatment (sintering).

To be crushed to a desired particle size, a ball size, a milling time, or a rotation speed per minute of the ball mill is controlled. For example, in consideration of a particle size, a ball size may be set to approximately 5 to 50 mm, and a rotation speed per minute of the ball mill may be set to approximately 20 to 100 rpm. The ball milling may be performed for 1 to 72 hours, and preferably 6 to 24 hours in consideration of the desired particle size.

In an exemplary embodiment of the present disclosure, in the wet crushing process, it is not necessary to separately add a seed for generating an alumina nucleus. This is because nano-scale micro alumina generated by eroding the high purity alumina lining material and the high purity alumina ball during crushing may serve as a seed for stimulating the transition of the boehmite or the activated alumina to $\alpha$-$Al_2O_3$ during thermal treatment (sintering), thereby forming a more highly-dense alumina-based abrasive grain.

The gel is crushed into micro particles by the ball milling, and thereby the particles have a uniform particle size distribution. In addition, in the wet crushing process of the gel having a network structure with the organic solvent, macropores contained in the gel having a network structure are removed. In the process of forming a gel during the gelation, the gel has macropores, and most of such macropores form a closed pore. The macropores in the gel may remain without being removed by a sintering process to be described below, and such macropores serve as a factor in making manufacture of a highly-dense sintered body difficult. Such macropores in the sintered body may serve as a cause for degrading a mechanical property of the alumina-based abrasive grain. In addition, the macropores may serve as a cause for inducing transformation in a molding process to be described below.

The crushed gel is dried to form powder. The drying may be performed at 60 to 180° C. for 30 minutes to 48 hours.

After the drying process, in the dried product, powder, some particles may be agglomerated. Accordingly, after drying, a crushing process may be further performed. The crushing process may be a dry crushing method, for example, one of various methods including a dry crushing method using a mixer, a dry ball milling method, etc.

The dry crushing process performed by ball milling will be described as an example. The dried product is charged to a ball mill. The dried product is mechanically crushed by rotating a ball mill at a constant speed. A ball used in the ball milling may be formed of alumina, and the balls may have the same size, and at least two different sizes. A ball size, a milling time, or a rotation speed per minute of the ball mill is controlled. For example, in consideration of a particle size, a ball size may be set to approximately 5 to 50 mm, and a rotation speed per minute of the ball mill may be set to approximately 20 to 100 rpm. The ball milling may be performed for 10 minutes to 48 hours. The product dried by ball milling may be crushed into micro particles having a size of 200 mesh (75 μm) or less, and the particles have a uniform particle size distribution.

The dried product or the product obtained by the dry crushing is blended with a binder and a solvent such as an ion exchanged water, and molded in a desired shape.

The binder may be, but is not limited to, polyvinyl alcohol (PVA), polyethylene glycol (PEG), or cellulose, and any organic material generally used as a binder may be used without limitation. The binder may be blended at 0.1 to 30 parts by weight, and preferably 0.5 to 20 parts by weight with respect to 100 parts by weight of the dried product or the product obtained by the dry crushing.

During the molding, a pressure of 10 to 100 MPa, and preferably 30 to 60 MPa may be applied. The molding may be performed by continuous compression molding or continuous press molding.

When the continuous compression molding is used, molding in a pellet-type may be performed.

Figure 2:
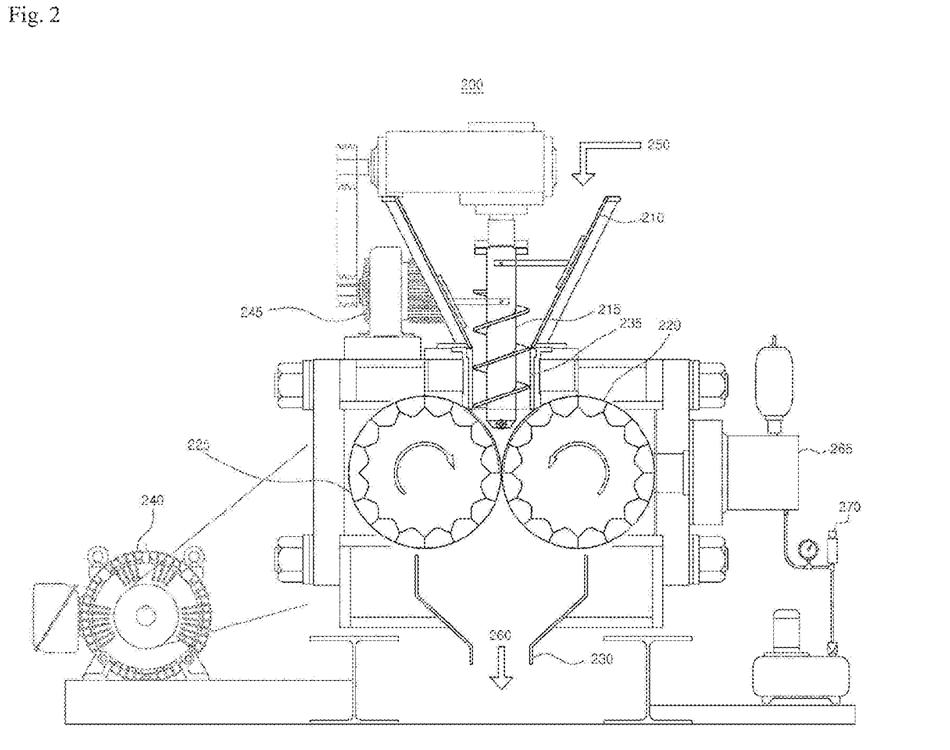
FIG. 2 is a diagram of an example continuous compression molding machine.

As a molding method, continuous compression molding will be described as an example. FIG. 2 is a diagram of an example continuous compression molding machine.

Referring to FIG. 2, as a compression molding machine 200 for continuous compression molding, a uniaxial compression molding machine having one screw 215 is used, or biaxial or triaxial machine may be used. The dried product or the product obtained by the dry crushing is charged to a hopper 210 of the compression molding machine, transferred to segment rolls 220 and 225 due to a compression action by rotation of the screw 215, strongly compressed in-between the segment rolls 220 and 225, and transferred to an outlet 230 to discharge after molded in a pellet-type having a certain cross-sectional shape.

The continuous compression molding will be described in further detail. The dried product or the product obtained by the dry crushing is charged through a hopper 210 of the compression molding machine, and the dried product or the product obtained by the dry crushing charged through a hopper 210 is transferred into a cylinder 235 at which an end of a screw 215 which provides compounding and compression is placed, transferred to segment rolls 220 and 225 due to a compression action by rotation of the screw 215, strongly compressed in-between the segment rolls 220 and 225, and transferred to an outlet 230. The product transferred to the outlet 230 is continuously discharged throughout the outlet 230 in a pellet-type.

The segment rolls 220 and 225 include a movable segment roll 220 and a fixed segment roll 225. The fixed segment roll 225 is fixed, and a compression strength of the movable segment roll 220 may be controlled to adjust a gap between the fixed segment roll 225 and the movable segment roll 220. The segment rolls 220 and 225 may be rotated by a first drive motor 240. The second drive motor 245 serves to operate rotation of the screw 215. The reference numeral 250 represents the dried product or the product obtained by the dry crushing charged to the hopper 210, and the reference numeral 260 represents a pellet discharged from the outlet 230. In addition, the reference numerals 265 and 270 represent a hydraulic cylinder and a pressure switch, respectively.

When continuous compression molding is used, a high density molded body having a relative density of approximately 40 to 55% may be obtained through high pressure molding. Such a high density molded body may manufacture a high density alumina-based abrasive grain having a relative density of 95% or more, and preferably 98% or more through the following process.

Throughout the process of mixing the gel with the organic solvent and crushing the mixture, the product obtained by the continuous compression molding (particles obtained by crushing the gel) may have a volume of pores present in the particles of 0.34 cm³/g, and an average pore diameter of 4.6 nm, and approximately 93% of the total pores have a size of 10 mm or less, and the maximum pore diameter is approximately 30 nm.

Figure 6:
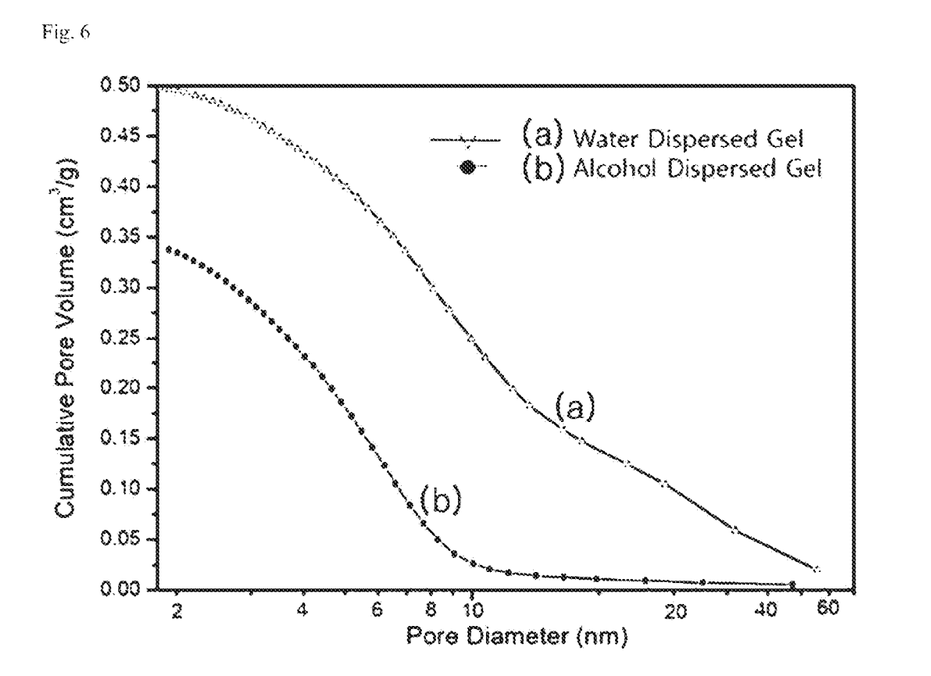
FIG. 6 is a graph showing a cumulative pore volume according to a pore diameter with respect to powder (200 mesh or less) used for compression molding in Example 1.

When the gel is not mixed with the organic solvent and crushed, the product obtained by the continuous compression molding (particles obtained by crushing the gel) may have a volume of pores present in the particles of 0.50 cm³/g, and an average pore diameter of 9.6 nm, and approximately 53% of the total pores have a size of 10 mm or less, and the maximum pore diameter is approximately 60 nm (refer to FIG. 6).

The product obtained by the continuous compression molding (particles obtained by crushing the gel) may have a volume of pores present in the particles of 0.50 cm³/g, and an average pore diameter of 9.6 nm, and approximately 50% of the total pores have a size of 10 mm or less, and the maximum pore diameter is approximately 60 nm (refer to FIG. 6).

The molded product is charged to a furnace such as an electric furnace, a rotary gas dispersion-type furnace, or a rotary electric resistance heating furnace, and calcination is performed. Hereinafter, a calcination method using a rotary gas dispersion-type furnace will be described as an example.

Figure 3:
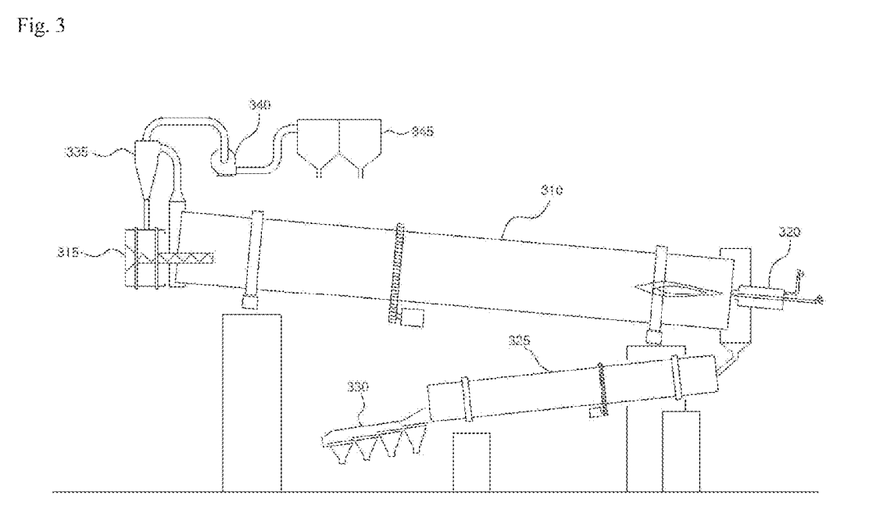
FIG. 3 is a diagram of an example rotary gas dispersion-type furnace.

FIG. 3 is a diagram of a rotary gas dispersion-type furnace.

Referring to FIG. 3, for calcination, a molded product is charged to a rotary tube furnace 310 using a feeder for fuel supply 315.

The rotary tube furnace 310 may be rotated at a predetermined speed (for example, 10 to 20 rpm). The rotary tube furnace 310 may be formed of steel, an inside of the rotary tube furnace 310 may be lined with alumina. The rotary tube furnace 310 is heated to a calcination temperature of approximately 400 to 800° C. by a heat source such as a gas burner 320. The gas burner 320 uses a gas or a diesel to spray a flame.

As the rotary tube furnace 310 tilted at approximately 5° is rotated, the charged product naturally flows toward the gas burner 320, resulting in calcination.

The calcination may be performed at 400 to 800° C., preferably 500 to 700° C., for 5 to 120 minutes, and preferably 10 to 40 minutes. During the calcination, an inner pressure of the rotary tube furnace 310 may be constantly maintained.

The binder is formed of an organic material, and burned to disappear when a temperature approaches 300 to 400° C., and a calcination temperature is higher than a temperature of burning off the organic material. Accordingly, when the calcination is completed, both the binder component and moisture are removed.

The calcination may be performed in an oxidizing atmosphere (for example, an oxygen ($O_2$) or air atmosphere).

The calcined product is naturally cooled by passing through a rotary cooler 325 tilted at approximately 15°. A cold air is injected into the rotary cooler 325 from an external environment.

The calcined product is dry-crushed.

The compression-molded pellet is calcined, and charged to a crusher such as a roll breaker, a cone breaker, a hammer mill or a ball mill to crush the pellet into particles having a size of 3.35 to 0.03 mm.

To transform at least one transition alumina selected from activated alumina including $\gamma$-$Al_2O_3$, $\delta$-$Al_2O_3$, $\theta$-$Al_2O_3$ and $\eta$-$Al_2O_3$ to $\alpha$-$Al_2O_3$, the dry-crushed product is sintered.

According to the sintering, the boehmite is also transformed to $\alpha$-$Al_2O_3$. The boehmite (AlOOH) is transformed to $\alpha$-$Al_2O_3$ as shown in Reaction Scheme 1. In addition, the activated alumina is also completely transformed to $\alpha$-$Al_2O_3$ by sintering.

$2AlOOH \rightarrow Al_2O_3 + H_2O$            [Reaction Scheme 1]

For sintering, the dry-crushed product is charged to an electric furnace such as a rotary gas dispersion-type furnace, or a rotary electric resistance heating furnace, and then sintered. Hereinafter, the sintering method using a rotary gas dispersion-type furnace will be described as an example.

FIG. 3 is a diagram of the rotary gas dispersion-type furnace.

Referring to FIG. 3, for sintering, the dry-crushed product is charged to the rotary tube furnace 310 using a feeder for fuel supply 315.

The rotary tube furnace 310 is rotated at a predetermined speed (for example, 10 to 20 rpm). The rotary tube furnace 310 may be formed of steel, and an inside of the rotary tube furnace 310 may be lined with alumina. The rotary tube furnace 310 is heated at a sintering temperature of 1200 to 1650° C., and preferably 1300 to 1500° C. using a heat source such as a gas burner 320. The gas burner 320 may use a gas or a diesel to spray a flame.

As the rotary tube furnace 310 tilted at approximately 5°, the charged product naturally flows toward the gas burner 320 to sinter, resulting in calcination.

The sintering may be performed at approximately 1200 to 1650° C., and preferably 1300 to 1500° C., for approximately 10 to 120 minutes. During the sintering, an inner pressure of the rotary tube furnace 310 may be constantly maintained.

At least one transition alumina selected from activated alumina including $\gamma$-$Al_2O_3$, $\delta$-$Al_2O_3$, $\theta$-$Al_2O_3$ and $\eta$-$Al_2O_3$ is transitioned to $\alpha$-$Al_2O_3$ at approximately 1150° C. or more. Accordingly, the sintering may be performed at the temperature in which at least one transition alumina selected from activated alumina including $\gamma$-$Al_2O_3$, $\delta$-$Al_2O_3$, $\theta$-$Al_2O_3$ and $\eta_h Al_2O_3$ is transitioned to $\alpha$-$Al_2O_3$, for example, 1200 to 1650° C. When the sintering temperature is less than 1200° C., due to unstable sintering, a thermal or mechanical property of the alumina-based abrasive grain may be poor, and when the sintering temperature is more than 1650° C., it is not economical due to high consumption of energy, and it brings about excessive particle growth, thereby degrading physical properties of the alumina-based abrasive grain.

The sintering may be performed at the sintering temperature for 10 to 120 minutes. When the sintering time is too long, it is not economical due to high consumption of energy, and it is difficult to expect a greater sintering effect, and when the sintering time is short, due to unstable sintering, the physical properties of the alumina-based abrasive grain may be poor.

In addition, the sintering may be performed in an oxidizing atmosphere (for example, an oxygen ($O_2$) or air atmosphere) or a neutral atmosphere (for example, an inert gas atmosphere such as an argon (Ar), helium (He), or nitrogen ($N_2$) atmosphere), but as long as an $\alpha$-$Al_2O_3$ crystal phase is formed, in a reducing atmosphere (for example, a hydrogen ($N_2$) gas atmosphere), the sintering may also be performed.

The sintered product is naturally cooled by passing through a rotary cooler 325 tilted at approximately 15°. A cold air is injected into the rotary cooler 325 from an outside.

The cooled product is classified, thereby obtaining alumina-based abrasive grains having a desired particle size distribution. The alumina-based abrasive grain particles are manufactured to have a particle size distribution according to a known specification (ISO, FEPA, KS, JIS, etc.). As a classification method, a vibrating screen, a tilted screen, or a ultrasonic screen is used. In FIG. 3, a vibrating screen 330 is shown. Reference numerals 335, 340, 345 which are not described in FIG. 3 represent a multi cyclone, an exhaust fan and a dust collector, respectively.

The alumina-based abrasive grain obtained as described above has a corundum crystal structure, which is formed in an $\alpha$-$Al_2O_3$ crystal phase.

According to the above-described method, a high purity alumina-based abrasive grain in which highly dense corundum crystals are formed to have a uniform size of 0.1 to 2 $\mu$m may be obtained.

The alumina-based abrasive grain may have a Vicker's hardness of 15 to 25 MPa, a fracture toughness of 2 to 10 MPa, and a bulk density of 3.70 to 3.92 g/cm3.

Hereinafter, examples according to the present disclosure will be described in detail, and the present disclosure is not limited to the following examples.

EXAMPLE 1

As starting materials, boehmite (AlOOH) powder and activated alumina powder were prepared. The boehmite powder had an average particle size of approximately 75 $\mu$m. The activated alumina powder was $\gamma$-$Al_2O_3$, and the activated alumina powder has an average particle size of approximately 53 $\mu$m.

Composition ratios of boehmite and $\gamma$-$Al_2O_3$ used in Example 1 are shown in Table 1 below.

TABLE 1

| Components | Units | Boehmite | $\gamma$-$Al_2O_3$ |
|---|---|---|---|
| $Al_2O_3$ | wt % | 70.7 | 96.5 |
| $Fe_2O_3$ | wt % | 0.004 | 0.03 |
| $SiO_2$ | wt % | 0.005 | 0.02 |
| $Na_2O$ | wt % | 0.004 | 0.30 |
| $TiO_2$ | wt % | 0.14 | 0.01 |
| Loss of ignition | wt % | 29.147 | 3.14 |

In Table 2, properties of the boehmite and $\gamma$-$Al_2O_3$ used in Example 1 are shown.

TABLE 2

| Properties | Unit | Boehmite | $\gamma$-$Al_2O_3$ |
|---|---|---|---|
| Specific surface area | $m^2/g$ | 268 | 120 |
| Pore volume | $cm^3/g$ | 0.65 | 1.21 |
| Particle size | $\mu$m | 75 | 53 |

The boehmite powder and the activated alumina powder were wet blended. The boehmite powder and the activated alumina powder were blended in a weight ratio of 2:1.

The wet-blending was performed by wet ball milling, and the wet ball milling was performed as described below. As starting materials, boehmite powder and activated alumina powder were uniformly mixed, charged to a ball mill to be crushed, and blended with an ion exchanged water. Here, as a deflocculant, nitric acid ($HNO_3$) was added to adjust a pH to approximately 3. An inner wall of the ball mill was lined with alumina which was the same as a component of the alumina-based abrasive grain, and a ball formed of alumina which was the same as the component for the alumina-based abrasive grain. The boehmite powder and the activated alumina powder were mechanically crushed and uniformly blended by rotating the ball mill at a constant speed. The ball size was approximately 10 mm, a rotation speed of the ball mill was approximately 25 rpm, and the ball milling was performed for approximately 48 hours. In the wet-blending process, a seed for generating an alumina nucleus was not separately added. According to the wet-blending process, a stable sol in which the boehmite and the activated alumina were uniformly dispersed was formed.

The sol was charged to the heating agitator shown in FIG. 1, and stirred so as not to generate a precipitate with heating at a first temperature higher than a room temperature and lower than a boiling point of the solvent used in the wet-blending process, such as an ion exchanged water. The first temperature was approximately 50° C. The heating was performed by injecting a hot air. The injection of a hot air was performed by providing an air to a heat exchanger using a pump to heat the air provided to the heat exchanger and injecting the hot air to the heating agitator. The hot air was injected under the sol and heated. The stirring was performed at a speed of approximately 10,000 rpm. The stirring was performed for approximately 12 hours. As the stirring progressed, the ion exchanged water was slowly evaporated, and therefore a viscosity of the sol was gradually increased.

When the viscosity of the sol was increased, and thus the sol became a high viscosity paste, a pressure was applied to the heating agitator (air injection method) to discharge the paste-state sol to a dry furnace, and the sol was dried in a hot air convection dry furnace at a second temperature of 120° C. for approximately 100 hours to form a gel.

The heating was performed by injecting a hot air. The gelation was performed for approximately 100 hours. As the gelation progressed, the solvent was evaporated, and therefore the sol became a gel having a network structure.

The dried gel was blended with an organic solvent, such as ethanol, and wet-crushed. The gel and the organic solvent were blended in a weight ratio of 1:1. The wet crushing was performed by a wet ball milling process, which was performed as to be described below. The gel was charged to a ball mill with the organic solvent. An inner wall of the ball mill was lined with alumina which was the same as the component of an alumina-based abrasive grain, and a ball formed of the alumina material which was the same as the component of an alumina-based abrasive grain was used. The gel was mechanically crushed by rotating the ball mill at a constant speed. The ball size was approximately 10 mm, a rotation speed of the ball mill was approximately 25 rpm, and the ball milling was performed for 10 hours. In the wet-blending process, a seed for generating an alumina nucleus was not separately added.

The crushed gel was dried, and dry-crushed to have a size of 200 mesh (75 μm). The dry crushing was performed by ball milling. The drying was performed at approximately 120° C. for approximately 48 hours.

The dry-crushed product was blended with a binder and an ion exchanged water, and molded in a pellet type. The binder was polyvinyl alcohol (PVA), and blended at 7.5 parts by weight with respect to 100 parts by weight of the dried product. In the molding, a pressure of 50 MPa was applied. The molding was performed by continuous compression molding. A compression molding machine for the continuous compression molding was the uniaxial compression molding machine having one screw shown in FIG. 2.

The continuous compression molding was performed as to be described below. The dried product was provided through a hopper 210 of the compression molding machine, the dried product provided through the hopper 210 was transferred into a cylinder 235 at which an end of a screw 215 was placed by compounding and compression, and the product obtained while providing compounding and compression was transferred to segment rolls 220 and 225 by rotation of the screw 215, and was transferred to an outlet 230 by being strongly compressed in-between the segment rolls 220 and 225, and the product transferred to the outlet 230 was continuously discharged to an outside from the outlet 230 in a pellet type.

Through the continuous compression molding, a high density molded body having a relative density of approximately 45 to 50% could be obtained. The molded body obtained as described above had a bulk density of approximately 1.80 to 2.0 g/cm³.

The molded product was charged to a rotary gas dispersion-type furnace to perform calcination.

For calcination, the molded product was charged to the rotary tube furnace 310 shown in FIG. 3 through a feeder for fuel supply 315.

The rotary tube furnace 310 was rotated at 10 rpm. The rotary tube furnace 310 was formed of a steel material, and an inside of the rotary tube furnace 310 was lined with alumina. The rotary tube furnace 310 was heated at a calcination temperature of approximately 650° C. using a heat source such as a gas burner 320.

The charged product naturally flowed toward the gas burner 320 since the rotary tube furnace 310 tilted at approximately 5° was rotated, and calcined for approximately 30 minutes. The calcination was performed in an air atmosphere.

The calcined product was naturally cooled and discharged through a rotary cooler 325 tilted at approximately 15°. A cold air was injected into the rotary cooler 325 from an outside.

The calcined product was dry-crushed. The dry crushing was performed using a roll breaker, and a particle size of the crushed product was classified to be 3.35 to 0.03 mm using a tilting screen.

The dry-crushed product was sintered in a rotary gas dispersion-type furnace.

For sintering, the dry-crushed product was charged to the rotary tube furnace 310 shown in FIG. 3 through the feeder for fuel supply 315.

The rotary tube furnace 310 was rotated at 10 rpm. The rotary tube furnace 310 was formed of a steel material, and an inside of the rotary tube furnace 310 was lined with alumina. The rotary tube furnace 310 was heated at a sintering temperature of approximately 1450° C. using a heat source such as the gas burner 320.

The charged product naturally flowed toward the gas burner 320 since the rotary tube furnace 310 tilted at approximately 5° was rotated, and sintered for approximately 40 minutes. The sintering was performed in an air atmosphere.

The sintered product was naturally cooled through the rotary cooler 325 tilted at approximately 15°. A cold air was injected into the rotary cooler 325 from an outside.

The cooled product after sintering was classified using a vibrating screen 330, thereby obtaining an alumina-based abrasive grain having a particle size distribution according to a known specification (ISO, FEPA, KS, JIS, etc.).

As described above, the alumina-based abrasive grain was obtained.

Table 3 shows components of the alumina-based abrasive grain manufactured according to Example 1.

TABLE 3

| Components | Contents (wt %) |
| --- | --- |
| $Al_2O_3$ | 99.8 |
| $Fe_2O_3$ | Less than 0.001 |
| $SiO_2$ | Less than 0.001 |
| $Na_2O$ | 0.01 |
| MgO | Less than 0.001 |
| $TiO_2$ | Less than 0.001 |

Table 4 shows properties of the alumina-based abrasive grain manufactured according to Example 1.

TABLE 4

| Properties | Results |
| --- | --- |
| Vicker's hardness | 21 MPa |
| Fracture toughness | 5.2 MPa |
| Bulk density | 3.86 g/cm$^3$ |

Figure 4:
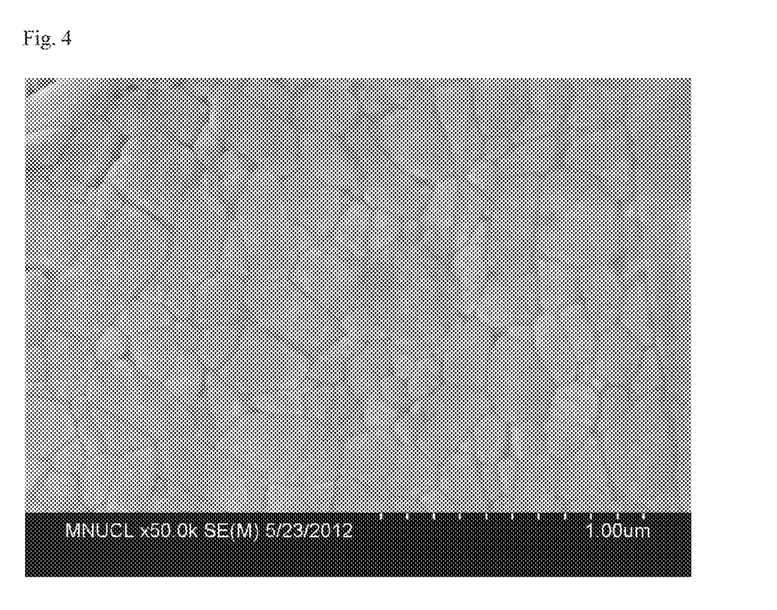
FIG. 4 is a scanning electron microscope (SEM) image of an alumina-based abrasive grain manufactured according to Example 1.

FIG. 4 is a scanning electron microscope (SEM) image showing the alumina-based abrasive grain manufactured according to Example 1.

Referring to FIG. 4, it is seen that the alumina-based abrasive grain having a crystal size of 0.1 to 2 μm was manufactured.

Figure 5:
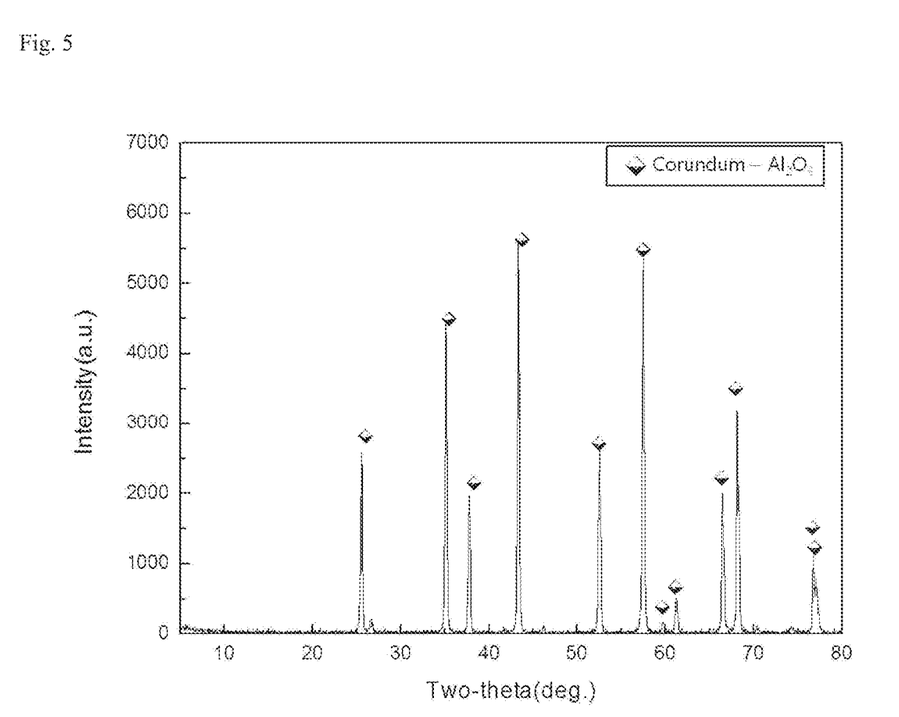
FIG. 5 is a graph showing an X-ray diffraction (XRD) pattern of the alumina-based abrasive grain manufactured according to Example 1.

FIG. 5 is a graph showing an X-ray diffraction (XRD) pattern of alumina-based abrasive grain manufactured according to Example 1.

Referring to FIG. 5, it is confirmed that the alumina-based abrasive grain manufactured according to Example 1 had a corundum crystal structure.

FIG. 6 is a graph of a cumulative pore volume according to a pore diameter of the powder (200 mesh or less) used in the compression molding. In FIG. 6, (a) is a graph of the case in which a gel was blended with water to perform wet crushing, and (b) is a graph of the case in which a gel was blended with an organic solvent such as ethanol to perform wet crushing.

Referring to FIG. 6, it is seen that the pore showed such a distribution when the diameter of the pore was 5 to 100 nm, and the powder obtained by wet crushing after the gel was blended with the organic solvent such as ethanol had a tendency to have smaller cumulative pore volume and pore diameter compared to the powder not going through the wet crushing after using the organic solvent such as ethanol.

According to the present disclosure, a highly dense alumina-based abrasive grain having a high hardness and a high purity can be manufactured using boehmite powder and activated alumina powder, and have an availability in the industry.

While the disclosure has been shown and described with reference to certain exemplary embodiments thereof, it will be understood by those skilled in the art that various modifications in form and details may be made therein without departing from the spirit and scope of the disclosure as defined by the appended claims.

The invention claimed is:

1. A method of manufacturing an alumina-based abrasive grain, comprising:
  (a) preparing boehmite powder and activated alumina powder as starting materials;
  (b) forming a sol by wet-blending the boehmite powder, the activated alumina powder, a solvent and a defloculant;
  (c) heating the sol at a first temperature which is higher than a room temperature and lower than a boiling point of the solvent and stirring the sol so as not to generate a precipitate;
  (d) forming a gel by heating the sol at a second temperature higher than the first temperature at which a viscosity of the sol is increased and the sol becomes a paste;
  (e) blending the gel with an organic solvent and performing wet crushing on the resulting mixture;
  (f) preparing a powder by drying the wet-crushed gel;
  (g) blending a binder and a solvent with the dried product, which is the powder, and molding the resulting mixture;
  (h) calcining the molded product;
  (i) performing dry crushing on the calcined product; and
  (j) sintering the dry-crushed product to transform activated alumina and boehmite contained therein to an α-Al$_2$O$_3$ crystal phase.

2. The method according to claim 1, wherein the activated alumina powder is formed of at least one transition alumina selected from γ-Al$_2$O$_3$, δ-Al$_2$O$_3$, θ-Al$_2$O$_3$ and η-Al$_2$O$_3$.

3. The method according to claim 1, wherein the boehmite powder and the activated alumina powder are blended in a weight ratio of 1:1 to 3:1.

4. The method according to claim 1, wherein the defloculant is at least one acid selected from nitric acid (HNO$_3$) and hydrochloric acid (HCl), and the sol has a pH of 2 to 5.

5. The method according to claim 1, wherein the wet-blending is performed by wet ball milling, an inner wall of a ball mill for the wet ball milling is lined with alumina, and a ball used in the wet ball milling is formed of alumina.

6. The method according to claim 1, wherein the heating in the step (c) is performed by injecting a hot air whose temperature is higher than the room temperature and lower than the boiling point of the solvent.

7. The method according to claim 6, wherein the injection of the hot air is performed by:
  supplying an air to a heat exchanger using a pump to heat the air, and injecting the hot air into a heating agitator, and
  as the hot air is introduced under the sol, thereby inducing convection of the sol, generation of a precipitation is inhibited, and uniform blending is performed.

8. The method according to claim 1, wherein the gel and the organic solvent are blended in a weight of 1:0.1 to 3, and at least one alcohol selected from ethanol and methanol is used as the organic solvent.

9. The method according to claim 1, wherein the wet crushing is performed by wet ball milling, an inner wall of a ball mill for the wet ball milling is lined with alumina, and a ball used in the wet ball milling is formed of alumina.

10. The method according to claim 1, wherein the dry crushing is performed by dry ball milling, an inner wall of a ball mill for the dry ball milling is lined with alumina, and a ball used in the dry ball milling is formed of alumina.

11. The method according to claim 1, wherein the molding is continuous compression molding, which comprises:
  supplying the dried product through a hopper of a compression molding machine;
  transferring the dried product injected through the hopper into a cylinder at which a position of an end of a screw is placed while providing compounding and compression due to rotation of the screw;
  transferring the resulting product transferred into the cylinder to a segment roll by the rotation of the screw;
  transferring the resulting product transferred to the segment roll to an outlet with compression in-between the segment rolls; and
  molding the resulting product transferred to the outlet in a pellet type after discharging to an outside.

12. The method according to claim 1, wherein the binder is at least one selected from polyvinylalcohol, polyethyleneglycol and cellulose, and blended at 0.1 to 30 parts by weight with respect to 100 parts by weight of the dried product.

13. The method according to claim 1, wherein the calcination is performed at 400 to 800° C., which is higher than a temperature for burning off the binder, in an oxygen atmosphere.

14. The method according to claim 1, wherein the calcination is performed by:
heating a rotary tube furnace at a calcination temperature of 400 to 800° C. using a gas burner;
charging the molded product to the rotary tube furnace using a feeder for fuel supply;
performing calcination while the charged product flows toward the gas burner due to the rotation of a tilted rotary tube furnace; and
transferring the calcined product to a tilted rotary cooler into which an external cold air flows for cooling.

15. The method according to claim 1, wherein the sintering is performed at 1200 to 1650° C., which is higher than the temperature at which the activated alumina is transitioned to the $\alpha$-$Al_2O_3$ crystal phase, in an oxidizing or neutral atmosphere.

16. The method according to claim 1, wherein the sintering is performed by:
heating a rotary furnace at 1200 to 1650° C. using a gas burner;
charging the dry-crushed product to the rotary tube furnace using a feeder for fuel supply;
sintering the charged product while the charged product flows toward the gas burner due to the rotation of a tilted rotary tube furnace;
transferring the sintered product to a tilted rotary cooler into which a cold air flows for cooling; and
classifying the cooled product using a vibrating screen to obtain an alumina-based abrasive grain having a desired particle size distribution.

17. The method according to claim 1, further comprising:
dry crushing the dried product between the step (f) and the step (g),
wherein the dry crushing of the dried product is performed by dry ball milling, an inner wall of a ball mill for the dry ball milling is lined with alumina, and a ball used for the dry ball milling is formed of alumina.

* * * * *